United States Patent [19]
Kerner

[11] Patent Number: 5,531,476
[45] Date of Patent: Jul. 2, 1996

[54] OCCUPANT RESTRAINT SYSTEM FOR MOTOR VEHICLES WITH AN AIRBAG

[75] Inventor: Wolfgang Kerner, Rottenburg, Germany

[73] Assignee: Mercedes-Benz AG, Stuttgart, Germany

[21] Appl. No.: 109,240

[22] Filed: Aug. 20, 1993

[30]  Foreign Application Priority Data

Aug. 20, 1992 [DE]  Germany .......................... 42 27 559.8

[51] Int. Cl.⁶ .................................................. B60R 21/16
[52] U.S. Cl. ...................................... 280/743.1; 280/728.3
[58] Field of Search .......................... 280/728 R, 743 R, 280/742, 728.1, 743.1, 728.3, 731

[56]  References Cited

U.S. PATENT DOCUMENTS

| | | | |
|---|---|---|---|
| 4,235,453 | 11/1980 | Lawson et al. | 280/743 |
| 4,903,986 | 2/1990 | Cok et al. | 280/743 |
| 5,004,266 | 4/1991 | Miller et al. | 280/743 |
| 5,009,452 | 4/1991 | Miller | 280/730 |
| 5,178,407 | 1/1993 | Kelley | 280/728 |
| 5,275,435 | 1/1994 | Fischer | 280/728 R |
| 5,342,087 | 8/1994 | Oda | 280/728 R |

FOREIGN PATENT DOCUMENTS

| | | | |
|---|---|---|---|
| 2944319 | 5/1981 | Germany | 280/743 |
| 3544704 | 6/1987 | Germany . | |
| 3707370 | 9/1988 | Germany . | |
| 3818185 | 8/1989 | Germany . | |
| 4115884 | 11/1991 | Germany . | |
| 0136943 | 6/1991 | Japan | 280/728 |
| 3279053 | 12/1991 | Japan | 280/743 |
| 0166453 | 6/1992 | Japan | 280/743 |
| 2257952 | 7/1992 | United Kingdom . | |

*Primary Examiner*—Paul N. Dickson
*Attorney, Agent, or Firm*—Evenson McKeown Edwards & Lenahan

[57] ABSTRACT

The invention relates to an occupant restraint system for motor vehicles having a gas bag or airbag which, when not in use, is accommodated collapsed in a housing or the like. In the event of an accident to the motor vehicle, the airbag is automatically inflated by a gas generator to form an absorption cushion protecting the occupant. In order to reduce if possible the risk of injury to the occupant on inflation of the airbag, the airbag is inflated with a relatively small expansion rate towards the driver and, in the lateral direction, with a relatively high expansion rate.

8 Claims, 2 Drawing Sheets

OCCUPANT RESTRAINT SYSTEM FOR MOTOR VEHICLES WITH AN AIRBAG

BACKGROUND AND SUMMARY OF THE INVENTION

The invention relates to an occupant restraint system for motor vehicles having a gas bag or airbag. When not in use, the airbag is accommodated collapsed in a housing-like accommodation space. In the event of an accident to the motor vehicle, the airbag is automatically inflated by means of a gas generator to form an absorption cushion protecting the occupant, in the clearance between the accommodation space and occupant, with the gas bag expanding with a comparatively slow expansion rate towards the occupant, that is to say in the axial direction, and with a comparatively high expansion rate in the lateral direction.

Gas bag systems have for some time now been standard fittings in motor vehicles and have proven their worth.

As regards a reliable effectiveness of the gas bag, comparatively short inflation times must be guaranteed in order to ensure that the gas bag has already been inflated to form an absorption cushion before the occupant is flung towards the cushion in the event of an accident.

Although in general the short inflation time does not pose any safety problem for the occupant, in special cases injuries—even if comparatively harmless—can occur to the occupant, for example if, at the instant of ignition of the gas generator and the beginning of the inflation process, the occupant assumes a position closely in front of the accommodation space of the airbag. This can take place for example because the occupant has bent forwards. Furthermore, there is in principle the possibility in an accident that the vehicle undergoes at first a relatively slight impact which does not yet lead to the ignition of the gas generator but nevertheless allows the occupant, possibly without a safety belt, to slip or slide towards the accommodation space of the airbag. If the gas generator is then ignited in a subsequent, more intense impact, the occupant is already within the space provided for the inflated airbag, that is to say the explosively expanding airbag strikes comparatively violently against the occupant.

In order to reduce this problem, it is known in principle from U.S. Pat. Nos. 4,903,986; 5,004,266 and 5,009,452, to arrange the airbag such that it at first expands preferentially in the lateral direction.

In the case of U.S. Pat. No. 4,903,986, it is provided to this end to arrange the airbag below a specially designed cover which first tears open laterally and thus permits an immediate lateral expansion of the airbag whilst an expansion towards the occupant is at first prevented or delayed until the covering tears open completely.

According to U.S. Pat. No. 5,004,266, it is provided to secure the central airbag region, which attempts to expand towards the passenger, by means of a tear strip made of spring steel and, correspondingly, to permit only a delayed expansion of this airbag region.

U.S. Pat. No. 5,009,452 provides for there to be arranged, within the collapsed airbag, a plate which is mounted on stationary parts of the accommodation space and with which the central airbag region is releasably clamped, so that on ignition of the gas generator the lateral airbag regions are at first inflated.

In German Patent 38 18 185 it is disclosed to retard the expansion of a airbag during inflation by means of tear seams; by means of which the pleats in the airbag sleeve are at first held together.

German Patent Document DOS 35 44 704 shows an airbag which, in the collapsed state, is folded such that, on ignition of the airbag, at first the central bag region is inflated in order to force open a cover protecting the folded-up airbag.

German Patent Document DOS 37 07 370 discloses closing off the accommodation space serving to accommodate the airbag and to receive the gas generator, on its side facing the occupant, by means of a cover which, on ignition of the gas generator, is torn open by the expanding airbag reproducibly at a predetermined rupture point which, in plan view, is essentially H-shaped.

A similar arrangement is also disclosed in German Patent Document DOS 41 15 884. In order to increase the mobility of the cover parts which are movable after tearing open the predetermined rupture point, it is also provided to design the lateral cover regions with especially thin walls.

An object of the invention is to provide an advantageous design with which, in an especially simple manner, different expansion rates of the airbag in the axial and lateral direction can be ensured.

This object is achieved according to the invention in that lateral airbag regions are folded in a zigzag-shaped manner and central airbag regions are folded so as to be self-retarding, by the fact that these airbag regions expanding in the axial direction are provided with tear seams and/or the fold layers of these airbag regions expanding in the axial direction are tucked into one another.

The measures provided according to the invention can be readily carried out within the scope of the work sewing and folding up—which is necessary in any case in the production of the airbag sleeve.

Other objects, advantages and novel features of the present invention will become apparent from the following detailed description of the invention when considered in conjunction with the accompanying drawings.

DETAILED DESCRIPTION OF THE DRAWINGS

Figure 1:
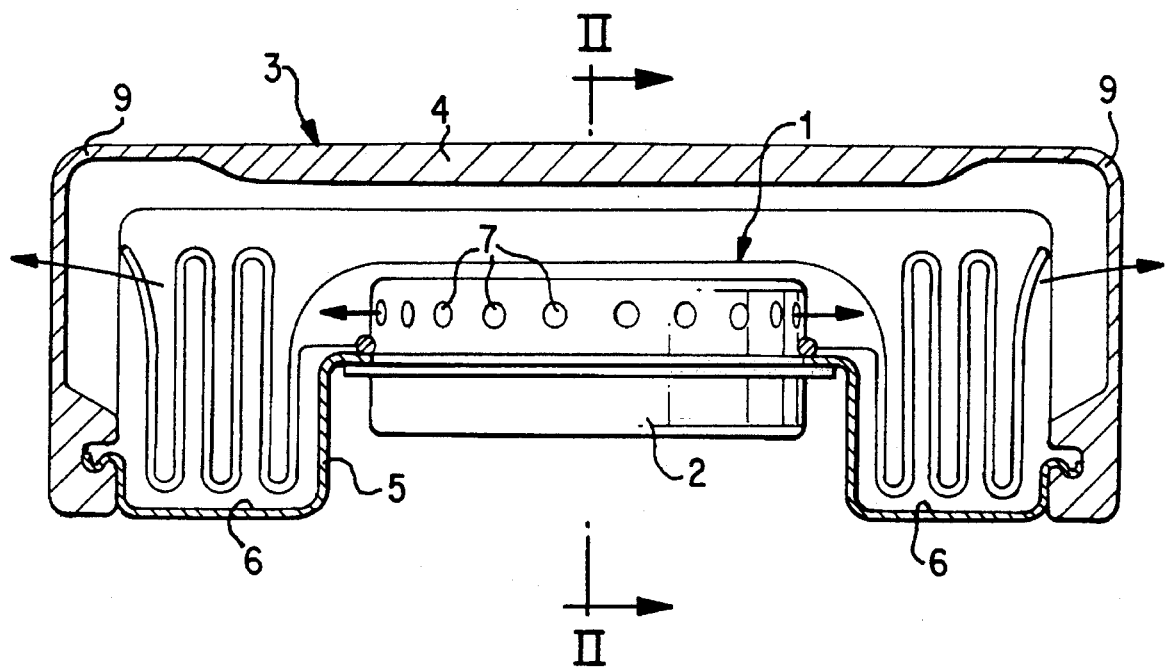
FIG. 1 is a longitudinal sectional view of a housing for receiving a collapsed airbag and its gas generator also the associated cover, constructed according to a preferred embodiment of the invention.
Figure 2:
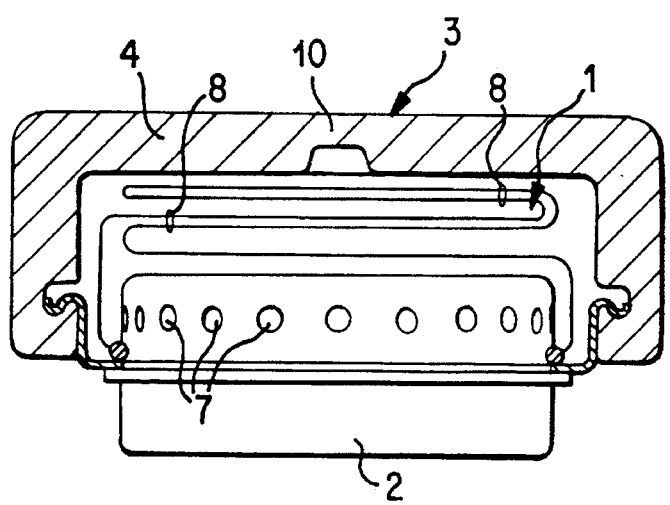
FIG. 2 shows a corresponding cross-section along section line II—II in FIG. 1.

A folded-up airbag 1 together with an associated gas generator 2 is accommodated in a housing 3 which is closed off, on its side facing the occupant to be protected, by a cover 4 which can be torn open.

The housing 3 possess a stable base 5 with depressions 6 arranged laterally to the gas generator 2.

The gas generator possesses a cylindrical canister-like housing with radially arranged openings 7 from which the generated gases emerge on ignition of the gas generator 2.

The airbag 1 possesses, accommodated in the depressions 6 which serve as packing pockets, lateral regions which are folded up in a zig-zag shape. Above the gas generator 2 there are disposed central airbag parts which are folded in a self-retarding manner in that the fold layers are prevented from excessively fast unfolding by means of tear filaments 8.

The cover 4, which is designed in the manner of a cushion, possesses very thin-walled lateral parts 9 and a central thick-walled region which is arranged between them and has a linear predetermined rupture point 10.

The illustrated arrangement functions as follows:

When the gas generator 2 is ignited, the gases flowing radially out of the openings 7 penetrate preferentially into the lateral regions of the airbag 1 which are accommodated in the packing pocket-like depressions 6 of the housing 3. A flowing of the gases into the central regions of the airbag 1 is, in contrast, delayed by the tear filaments 8.

The expanding lateral regions of the airbag 1 force open the thin-walled lateral parts 9 of the cover 4, so that the airbag 1 continues to expand preferentially in the lateral direction and the cover only tears open in the region of the predetermined rupture point 10 with a certain delay, so that the airbag 1 can finally inflate completely to the desired size and shape.

The thin-walled lateral parts 9 of the cover 4 are expediently arranged such that the laterally expanding airbag 1 cannot be damaged on fixed parts arranged laterally to the housing 3, such as for example the spokes of a steering wheel or parts on the instrument panel or dashboard.

Insofar as the housing 3 is accommodated in the hub of a steering wheel, the thin-walled lateral parts 9 of the cover 4 are preferably arranged such that the laterally expanding airbag strikes only to a diminished extent, if at all, against the driver's hands holding the steering wheel when a hand posture typical for driving straight ahead is assumed.

Figure 3:
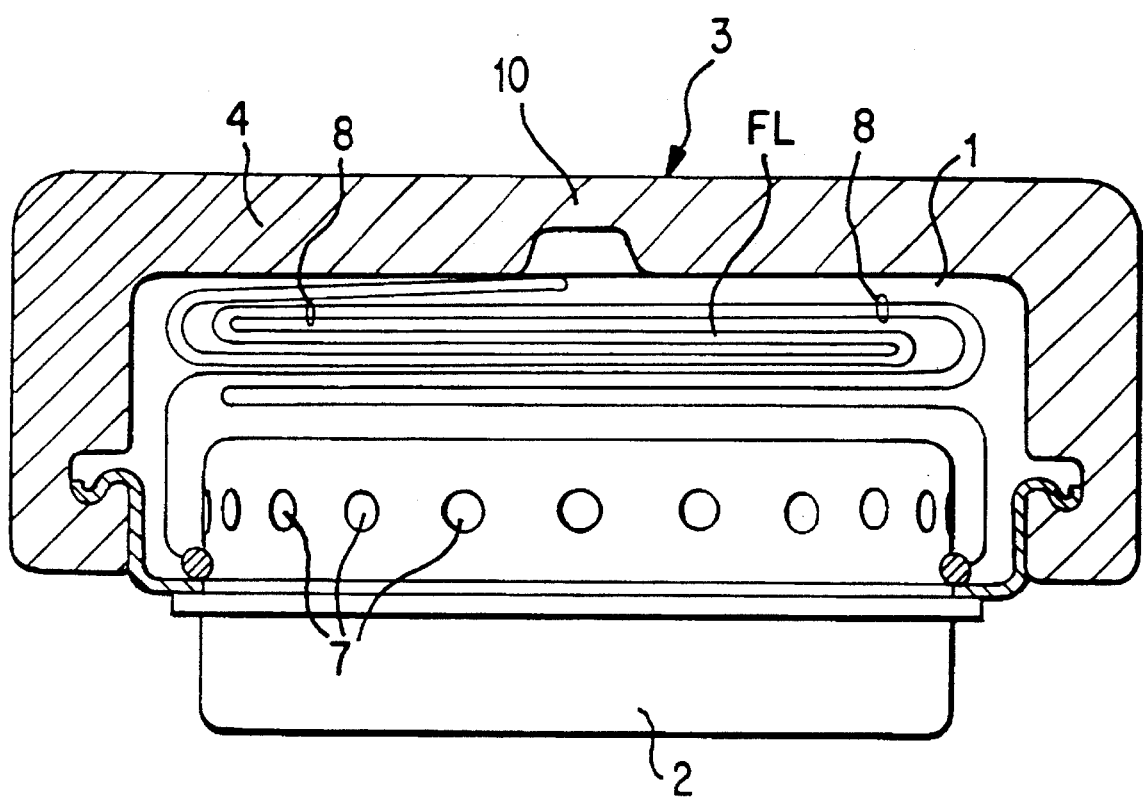
FIG. 3 is a sectional view showing another preferred embodiment of the invention with central airbag parts folded in a self-retarding manner.

FIG. 3 schematically depicts an embodiment wherein the fold layers FL of central airbag regions are tucked into one another.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. An airbag system for protecting vehicle passengers in the event of a vehicle collision, comprising:

an airbag in a folded-up non-inflated condition, a gas generator for inflating the airbag, and a housing for accommodating the airbag;

said airbag having central regions axially facing a vehicle passenger when in an in-use position and lateral regions disposed laterally of the central regions, said lateral regions being folded in a zig zag shaped manner for being easily inflated and the central regions being folded in a different manner than the lateral regions so as to be retarded against axial expansion toward the passenger upon inflation of the airbag, said housing being closed off by a cover which can be torn open by inflation of said airbag, said cover having very thin-walled lateral parts covering the lateral regions of the airbag and a thick-walled central part having a predetermined rupture point and covering the central regions of the airbag, said cover being configured such that said lateral parts are torn open upon inflation of the airbag prior to the central part which tears open with a certain delay.

2. An airbag system according to claim 1, wherein the housing includes an accommodation space which possesses relatively large packing depressions arranged laterally of the gas generator, said large packing depressions serving for accommodating the air bag in the folded-up non-inflated condition.

3. An airbag system according to claim 1, wherein adjacent folds of the central regions are interconnected to one another to thereby resist axial expansion of the central regions.

4. An airbag system according to claim 3, wherein said folds of the central regions are interconnected by tear filaments.

5. An airbag system according to claim 1, wherein the gas generator is configured to blow out gases substantially only radially to the axial direction on ignition.

6. An airbag system according to claim 3, wherein the gas generator is configured to blow out gases substantially only radially to the axial direction on ignition.

7. An airbag system according to claim 3, wherein the housing includes an accommodation space which possesses relatively large packing depressions arranged laterally of the gas generator, said large packing depressions serving for accommodating the airbag in the folded-up non-inflated condition.

8. An airbag system according to claim 2, wherein said packing depressions are disposed only over a certain portion of the circumference of the gas generator.

* * * * *